(12) United States Patent
Mizugaki et al.

(10) Patent No.: US 7,336,740 B2
(45) Date of Patent: Feb. 26, 2008

(54) RADIO SIGNAL RECEIVING METHOD AND RADIO SIGNAL RECEIVER

(75) Inventors: Kenichi Mizugaki, Kokubunji (JP); Hideya Suzuki, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 668 days.

(21) Appl. No.: 10/788,461

(22) Filed: Mar. 1, 2004

(65) Prior Publication Data
US 2005/0013392 A1    Jan. 20, 2005

(30) Foreign Application Priority Data
Jul. 17, 2003    (JP) .............................. 2003-198186

(51) Int. Cl.
*H04L 27/06*    (2006.01)
(52) U.S. Cl. ................. 375/343; 375/342; 375/350; 375/316; 375/146; 375/149
(58) Field of Classification Search ............... 375/316, 375/340, 343, 146, 350
See application file for complete search history.

(56) References Cited

U.S. PATENT DOCUMENTS

| | | | | |
|---|---|---|---|---|
| 4,777,629 | A | * | 10/1988 | Morris et al. ................ 367/69 |
| 5,841,808 | A | * | 11/1998 | Rizzo et al. ................ 375/150 |
| 6,512,455 | B2 | * | 1/2003 | Finn et al. ............... 340/572.1 |
| 6,925,109 | B2 | * | 8/2005 | Richards et al. ............ 375/150 |
| 7,126,982 | B1 | * | 10/2006 | Barham et al. ............. 375/150 |
| 2004/0165686 | A1 | * | 8/2004 | Siwiak ........................ 375/350 |
| 2004/0174928 | A1 | * | 9/2004 | Siwiak et al. ............... 375/146 |

OTHER PUBLICATIONS

Win et al, "Impulse Radio: How it Works", IEEE Communications Letters, vol. 2, No. 2, Feb. 1998, pp. 36-38.

* cited by examiner

*Primary Examiner*—Chieh M. Fan
*Assistant Examiner*—Siu M Lee
(74) *Attorney, Agent, or Firm*—Mattingly, Stanger, Malur & Brundidge, P.C.

(57) ABSTRACT

A radio signal receiving method grasps features of a propagation path at the start of communication and generates a template waveform corresponding to the features. A receiver examines a reception waveform of a propagation path condition judgment portion contained in a header portion of a packet, individually generates the template waveform in each communication session and performs correlation detection on the basis of the template waveform generated individually.

9 Claims, 9 Drawing Sheets

RADIO SIGNAL RECEIVING METHOD AND RADIO SIGNAL RECEIVER

BACKGROUND OF THE INVENTION

This invention relates to a radio signal receiving method of a radio communication system using pulse signals, and a radio signal receiver.

In a UWB (Ultra Wideband) system, for example, communication is conducted generally by using pulse signals. A receiver restores transmitted information by conducting correlation detection of a reception signal and a template pulse by using the template pulse corresponding to a pulse waveform.

Win, M. Z.; Scholtz, R. A, "Impulse radio: how it works", IEEE Communications Letters, February, 1998, Volume: 2, Issue: 2 describes a UWB communication system that modulates Gaussian mono pulses by a PPM (Pulse Position Modulation) system.

Figure 14:
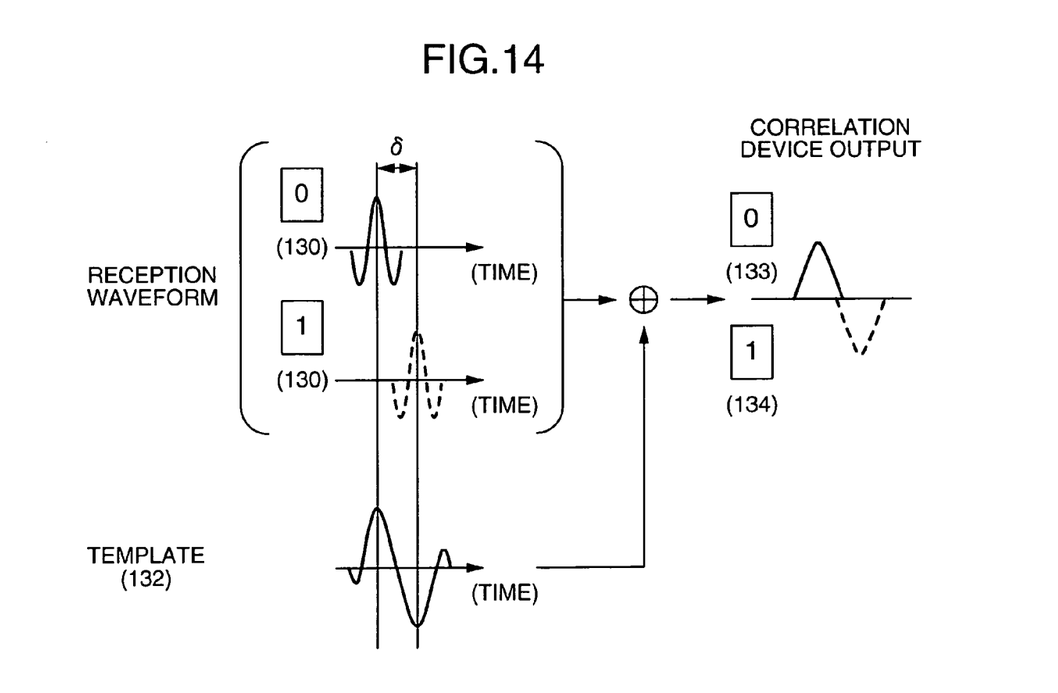
FIG. 14 shows an example of a signal waveform at the time of demodulation in a PPM system.

In the PPM system, transmission is made while the position of the pulse waveform on a time axis is changed by a predetermined value (δ) in accordance with information to be transmitted. The receiver performs correlation detection by using the reception waveform and the template pulse and takes out the information. FIG. 14 shows typical demodulation flow of the PPM system. The template pulse (132) is created by synthesizing a reception waveform (130) when the information is 0 and a waveform obtained by inverting the phase of a reception waveform (131) when the information is 1. This template pulse will be hereinafter referred to as a "reference template". When a correlation value of this reference template and the reception signal is integrated, an output becomes positive (133) when the transmitted signal is 0 and negative (134) when the signal is 1.

The template waveform used for reception in the prior art system remains the same in all the propagation environments. Consequently, the correlation detection output decreases at places at which a reception waveform is distorted by influences of multi-paths and reception characteristics are deteriorated.

SUMMARY OF THE INVENTION

The object of the invention is to suppress the drop of the output of correlation detection even at those places at which the reception waveform gets distorted due to influences of multi-paths, and so forth, and therefore to improve the reception characteristics of the receiver without calling for the addition of new functions to the transmission side and for the increase of transmission power.

The invention grasps features of a propagation path at the start of communication, generates a template waveform corresponding to the features of the propagation path and improves reception characteristics and communication quality. A receiver examines a reception waveform of a propagation path condition judgment portion contained in a header portion of a packet, individually generates a template waveform in each communication session and efficiently performs correlation detection. It is possible to provide a radio signal receiver in a radio communication system for executing communication by transmitting and receiving pulse signals, comprising: a template generation portion for generating a template; and a correlation device for calculating correlation between the template generated and a signal received from a transmitter; wherein said template generation portion generates the template on the basis of a reception waveform of a first signal as a known signal received from said transmitter; and said correlation device determines a correlation between a second signal received from said transmitter and the template and discriminates the second signal on the basis of the correlation result.

DESCRIPTION OF THE EMBODIMENTS

Figure 1:
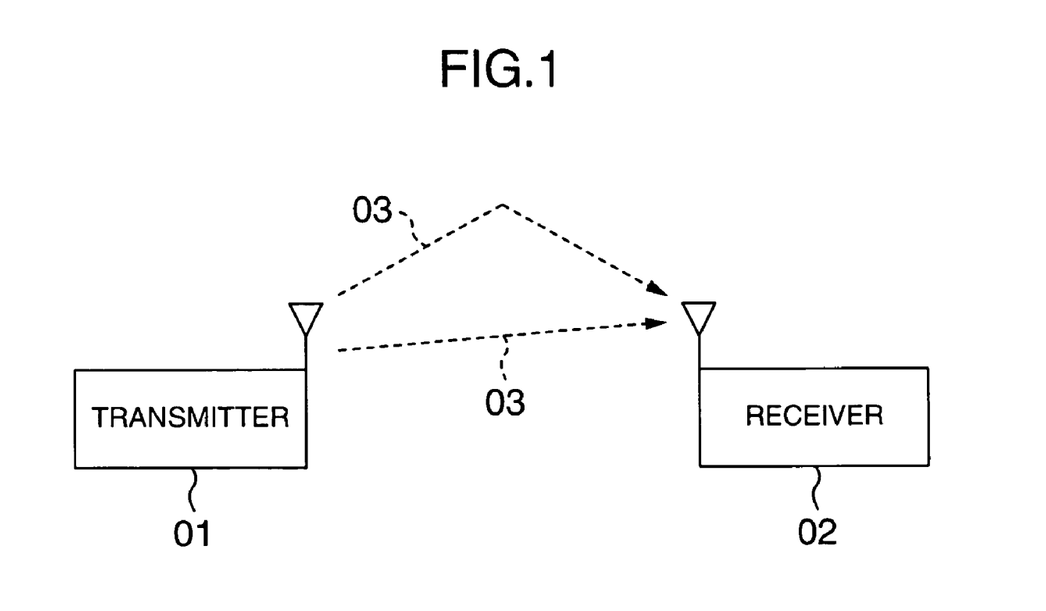
FIG. 1 shows an example of a communication system using a pulse signal.

FIG. 1 shows a communication system using a pulse signal as an embodiment of the invention. In this system, a transmitter (01) performs radio transmission of a pulse signal (03) to a receiver (02) and performs communication. Transmitted information is subjected to PPM modulation and is converted to a pulse train inside the transmitter, is gathered into a packet by putting a header for communication control, etc, and is transmitted as a radio signal to the receiver.

Figure 2:
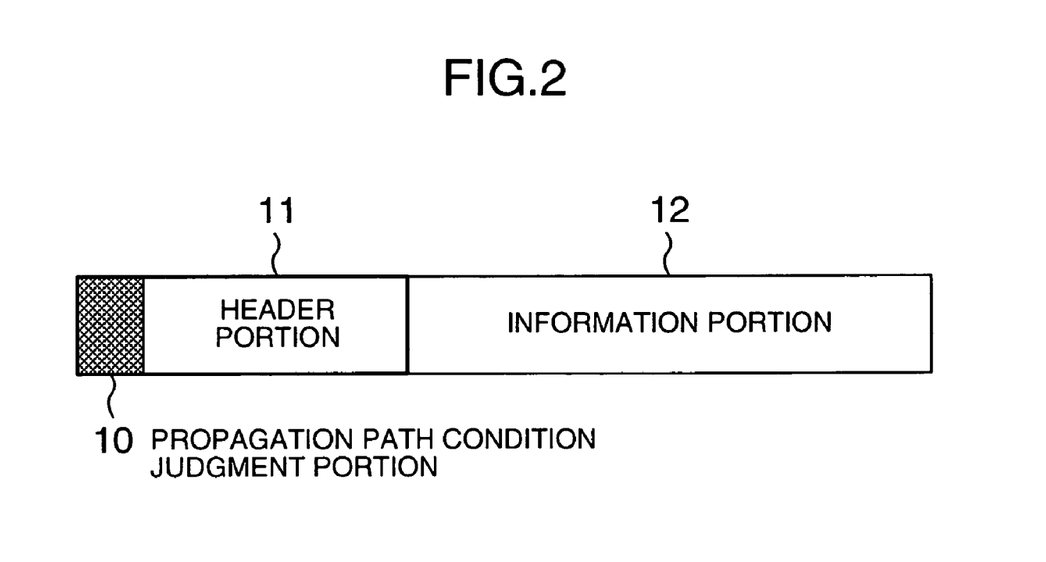
FIG. 2 shows an example of a structure of a packet.

FIG. 2 shows an example of a structure of a packet in the invention. The packet has a header portion (11) inclusive of a propagation path condition judgment portion (10), and an information portion (12). The information is divided into a suitable size and is transmitted after the header portion (11) describing information necessary for the communication is added. The header portion contains the propagation path condition judgment portion (10) that is used for generating a template waveform. When all the signals of the propagation path condition judgment portion are set in advance to 0, for example, the condition of the propagation path can be estimated from the reception waveform in accordance with a rule set between the transmitter and the receiver. The invention embraces within its scope an arrangement that does not provide dedicatedly the propagation path condition judgment portion to the header portion but uses a part of known information contained in the header portion for the propagation path condition judgment. The invention further embraces within its scope the construction in which both of the header portion and the information portion have the propagation path condition judgment portion, individually generate the template waveform and execute demodulation.

Figure 3:
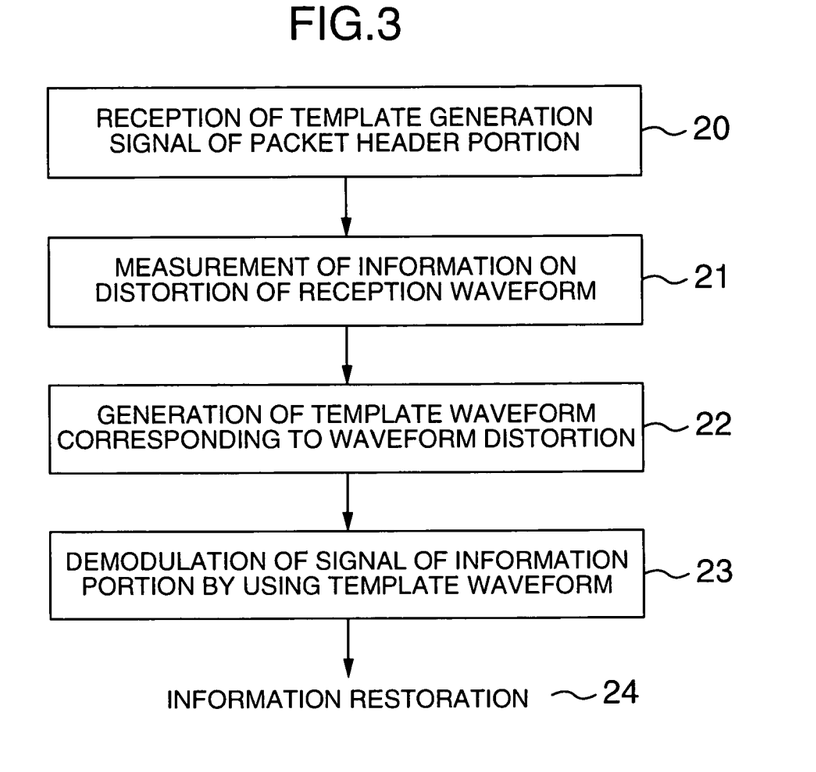
FIG. 3 is a flowchart of demodulation of a reception signal.

FIG. 3 shows a demodulation procedure of the reception signals in the invention. Receiving the packet (20), the receiver first measures a degree of distortion of the pulse waveform by use of the propagation path condition judgment portion contained in the header portion (21). Next, a template waveform generator of the receiver generates a corresponding template waveform (22) on the basis of the information of waveform distortion acquired by this measurement. The receiver applies the template waveform to demodulation of the information portion of the packet (23) and restores the transmitted information (24). Incidentally, the invention embraces also within its scope a method that puts the propagation path condition judgment portion to the leading part of the header portion and performs demodulation of the information other than that of the propagation path condition judgment portion of the header portion by using the template waveform. The invention further embraces within its scope a method that generates template waveforms for a plurality of reception signal waveforms and uses the means of the outputs as a final template waveform.

Figure 4:
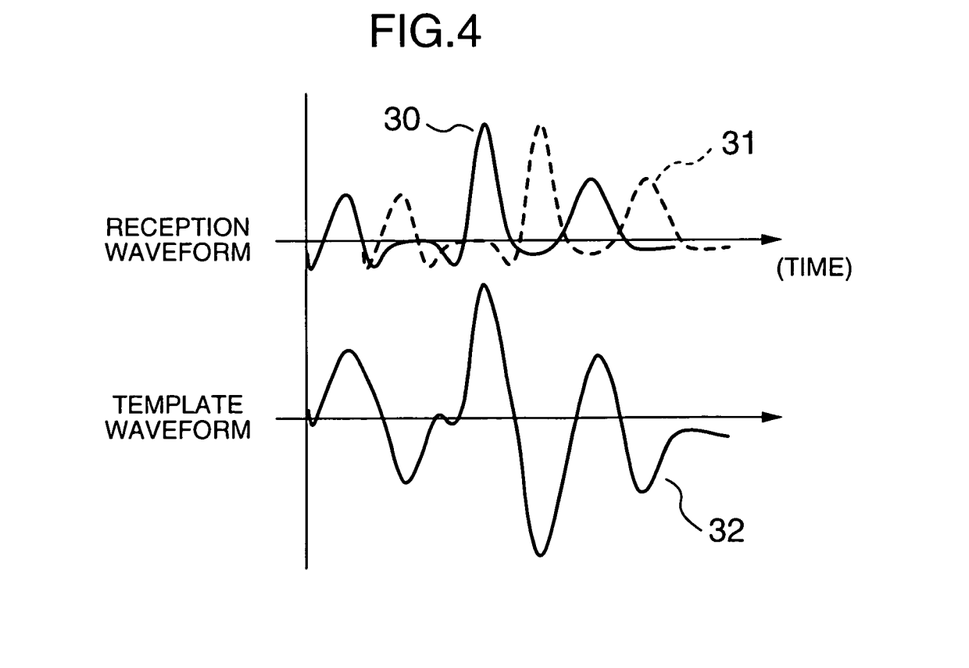
FIG. 4 shows an example of a template waveform.

FIG. 4 shows an example of the template waveform corresponding to the waveform distortion in the invention. The diagram shows a reception waveform (30) when data "0" is transmitted, a reception signal (31) when data "1" is transmitted and a template waveform (32) corresponding to these reception waveforms (30) and (31). Here, the template waveform (32) can be obtained by inverting the reception waveform (31) representative of the data "1" and adding the reception waveform (30) representative of the data "0" to the former. In a multi-path environment, the receiver receives signals passing through a plurality of different paths. Therefore, the reception waveform is the one that has a plurality of amplitude peaks and is distorted as indicated by reference numeral (30). When the transmitter, the receiver and surrounding objects do not move during communication, the condition of the propagation paths is stationary. Therefore, the receiver can acquire better reception characteristics by generating the template waveform in match with these reception waveforms (30) and (31) than when the template pulse is used.

Figure 5:
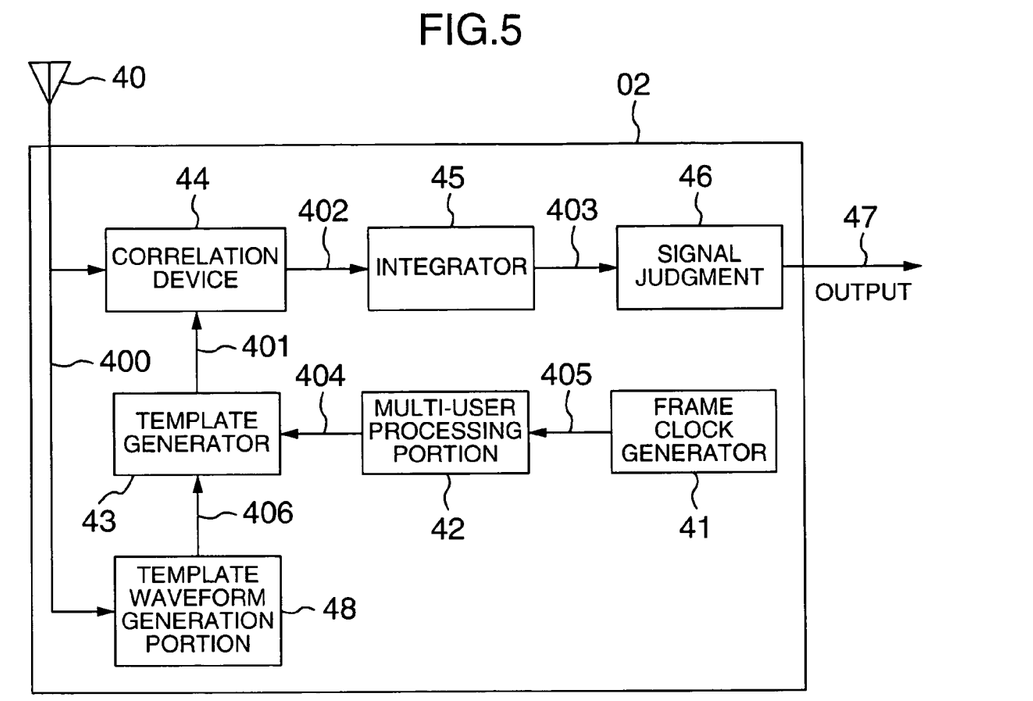
FIG. 5 shows an example of a block diagram of a receiver.

FIG. 5 shows an example of a functional block of the receiver for generating the template waveform corresponding to the reception waveforms. The receiver (02) includes an antenna (40) for receiving a reception signal (400), a frame clock generator (41), a multi-user processing portion (42), a template generator (43), a correlation device (44), an integrator (45), a signal judgment portion (46) and a template waveform generator (48). The multi-user processing portion processes a signal (405) for multi-user access. An example of the multi-user processing method is a time hopping processing that applies a code system extending straight to each user and changes a pulse position on the time axis in such a fashion as to correspond to the system. The template generator receives the template waveform (406) corresponding to the reception waveform from the template waveform generator and outputs a template signal (401) in accordance with an instruction from the multi-user processing portion using a pulse clock (404). Generation of the pulse clock (404) in the multi-user processing portion (42) is performed on the basis of the frame clock 405 from the frame clock generator (41). The receiver executes correlation detection by inputting the signal waveform received and the template waveform to the correlation device, integrating (403) the output values (402), judging the sign, demodulating the transmitted information and outputting it as an output signal (47).

A method that detects a signal arriving path from the reception waveform and generates a template waveform corresponding to this path will be explained as one of the methods of generating the template waveform. This method will be hereinafter referred to as a "path estimation method".

Figure 6:
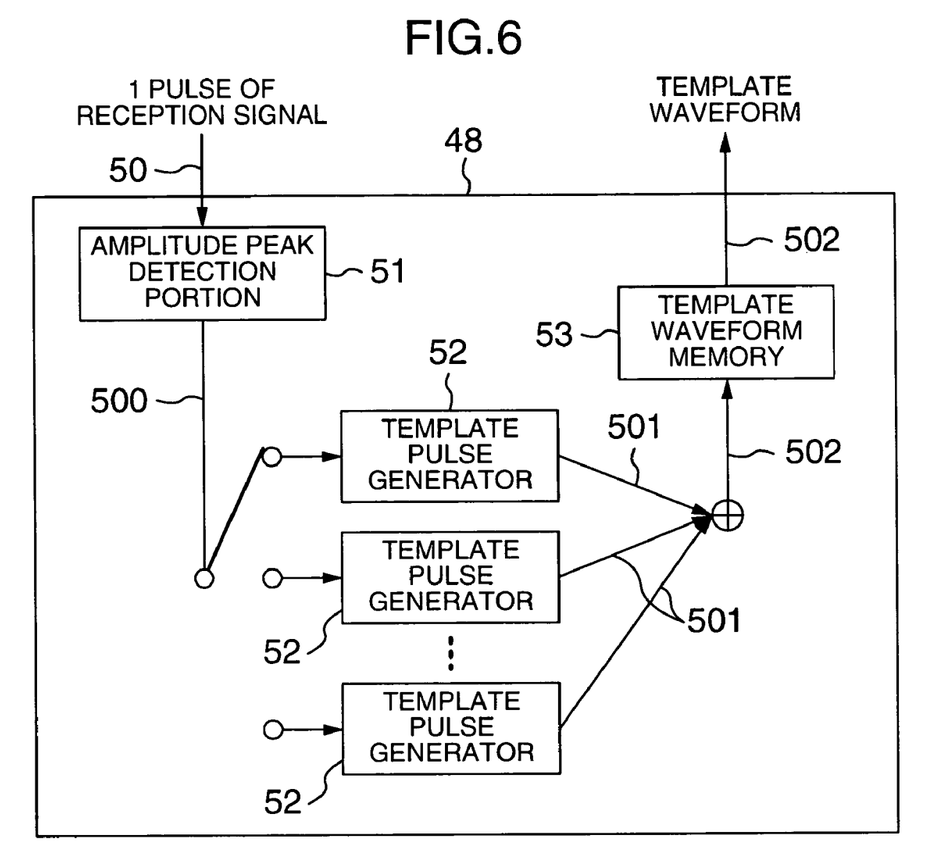
FIG. 6 shows an example of a block diagram of a template waveform generation portion by a path estimation method.

FIG. 6 shows an example of a functional block diagram of the template waveform generation portion using the path estimation method according to the invention. The template waveform generation portion includes an amplitude peak detection portion (51), a template pulse generator (52) and a template waveform memory (53). The amplitude peak detection portion detects an amplitude peak contained in one reception pulse and measures a magnitude of the amplitude of this peak. The template pulse generator generates a template pulse (501) on the basis of a template pulse generation instruction (500) from the amplitude peak detection portion. More concretely, detecting the amplitude peak, the amplitude peak detection portion actuates the template pulse generator in match with the detection timing and lets it output a reference template stored in advance. After actuating the template pulse generator, the amplitude peak detection portion switches the template generator to a next template pulse generator. Consequently, even when the timings of the detected amplitude peaks are extremely close to each other, a plurality of template pulse generators can be actuated in parallel and an output as a result of superposition of a plurality of reference templates can be obtained. The reference template is amplified and outputted at this time in accordance with the magnitude of the peak. The template waveform memory stores the template waveform (502) so generated.

Figure 7:
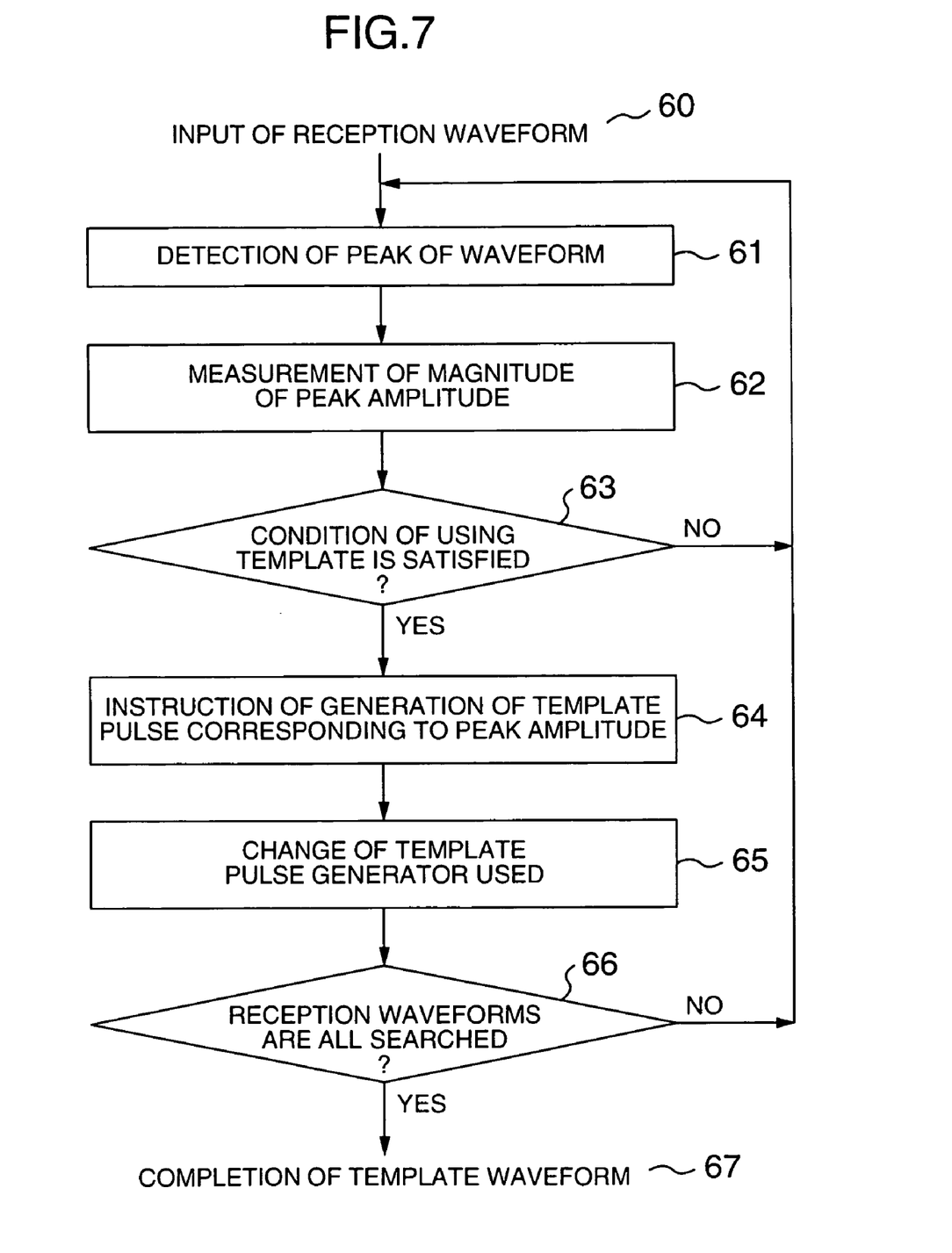
FIG. 7 shows an example of a flowchart of the path estimation method.

FIG. 7 shows an example of the template waveform generation procedure by the pulse estimation method according to the invention. The receiver segments by one pulse content the reception waveform of the propagation path condition judgment portion of the packet header portion and inputs it into the amplitude peak detection portion (60). The amplitude peak detection portion searches the amplitude of the waveform inputted and detects the peak of this amplitude (61). A method that detects a maximum value of the waveform amplitude is known as a peak detection method, for example. The amplitude peak detection portion measures the amplitude value of the peak detected (62) and judges whether or not this peak is to be used for generating the template waveform. A method is available that sets a threshold value by use of the maximum value of the waveform amplitude, for example, as the judgment reference and uses it for generating the template waveform when the amplitude value exceeds the threshold value. Judging that the peak is used for generating the template waveform, the amplitude peak detection portion instructs the template pulse generator to generate the template pulse corresponding to the amplitude of the peak (64). To cope with the case where the requests for the generation of the template pulses occur continuously, the template waveform generation portion changes the template pulse generator connected to the amplitude peak detection portion to another template pulse generator (65). When this processing is repeated and the amplitude peak detection portion finishes the search of the inputted waveforms (66), the synthetic waveform of the output of the template pulse generators is stored in the template waveform memory (67). Generation of the template is preferably performed in each communication session. When the propagation path condition is judged stable such as when a plurality of packets is transmitted within a relatively short time, the template synthesized may be utilized consecutively.

Figure 8:
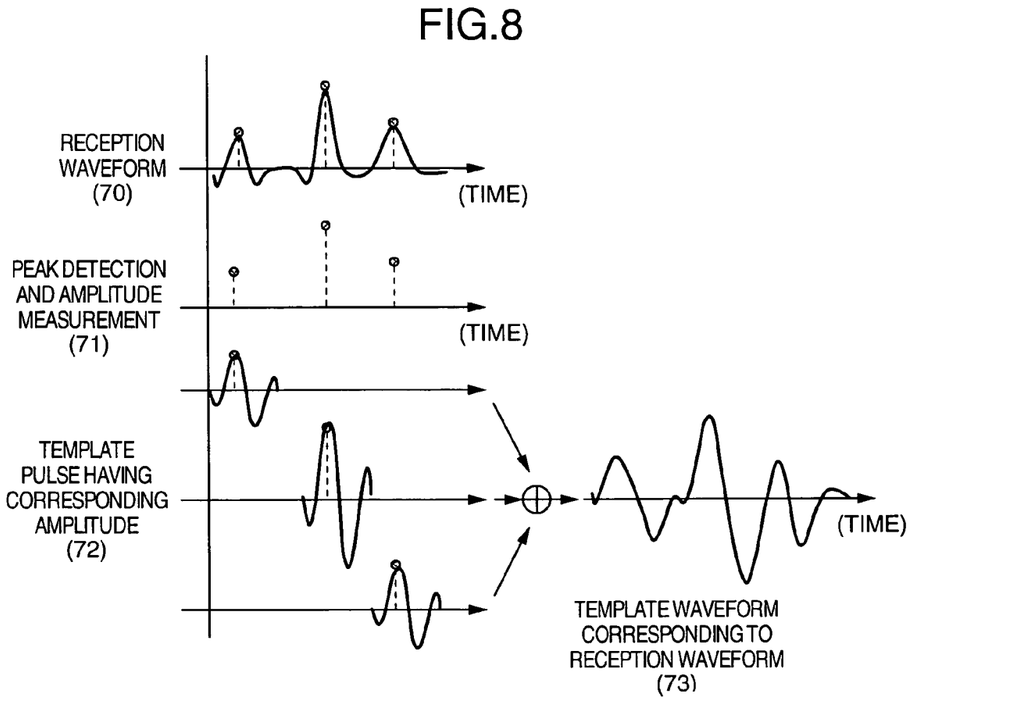
FIG. 8 shows an example of a template waveform in the path estimation method.

FIG. 8 shows an example of the relation of the reception waveform (70), peak detection and the measurement result of the amplitude (71), a template pulse group corresponding to the measurement result and the template waveform (73). The influences exerted on the pulse signals in the wireless space between the receiver and the transmitter can be observed by acquiring the reception waveform of one pulse content of the propagation path condition judgment portion. Since the propagation path condition judged in this manner is believed similar to the pulse signals received in the path subsequent to the propagation path condition judgment portion, communication can be conducted more precisely and more efficiently by creating the template in accordance with the propagation path condition by the method according to the invention and receiving the subsequent signals than in the prior art systems. Next, a method that measures the path reception timing of the reception waveform and creates the template waveform on the basis of the former will be explained. This method will be hereinafter referred to as a "reception timing measurement method".

Figure 9:
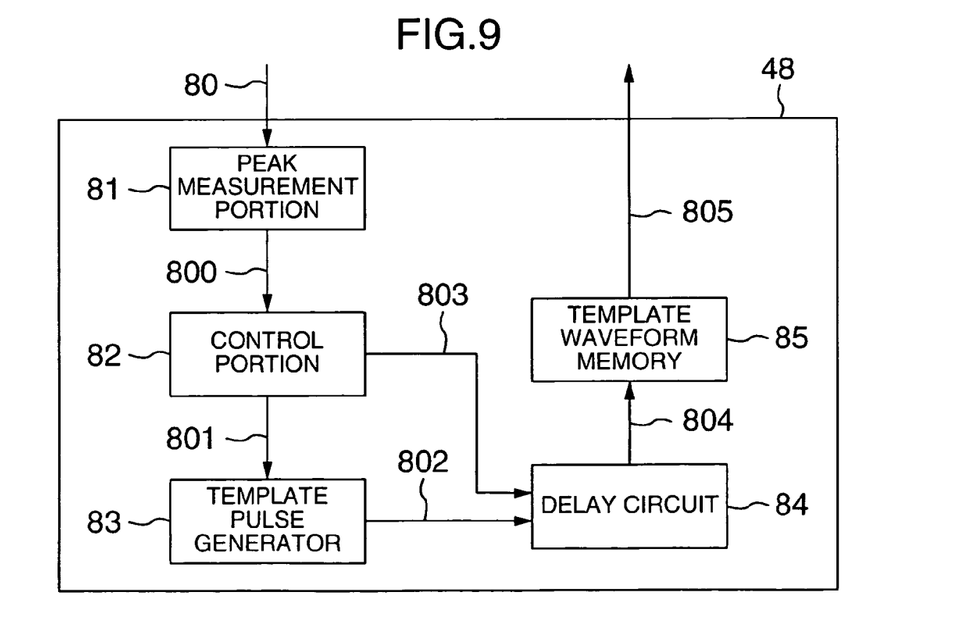
FIG. 9 shows an example of a block diagram of a template waveform generation portion of a reception timing measurement method.

FIG. 9 shows an example of a functional block diagram of the template waveform generation portion using the reception timing measurement method according to the invention. The template waveform generation portion includes a peak measurement portion (81), a control portion (82), a template pulse generator (83), a delay circuit (84) and a template waveform memory (85). The peak measurement portion measures the number of amplitude peaks contained in one reception pulse and the timing, and the amplitude values of the peaks. A peak measurement method is known that executes A/D conversion of the input waveforms to acquire digital signals and processes them with a CPU. The control portion instructs (801) the template pulse generator to generate pulses on the basis of the measurement result (800) of the peak measurement portion. The template pulse generator generates the template pulse (802) on the basis of the amplitude instructed from the control portion. More concretely, the reference template stored in advance is amplified and outputted in accordance with the magnitude of the amplitude of the peak. The delay circuit applies a delay (803) to the template pulse on the basis of the peak timing instruction notified from the control portion. The template waveform memory (85) stores and synthesizes the output of the delay circuit, that is, a delay template pulse (804), and outputs the pulse (805).

Figure 10:
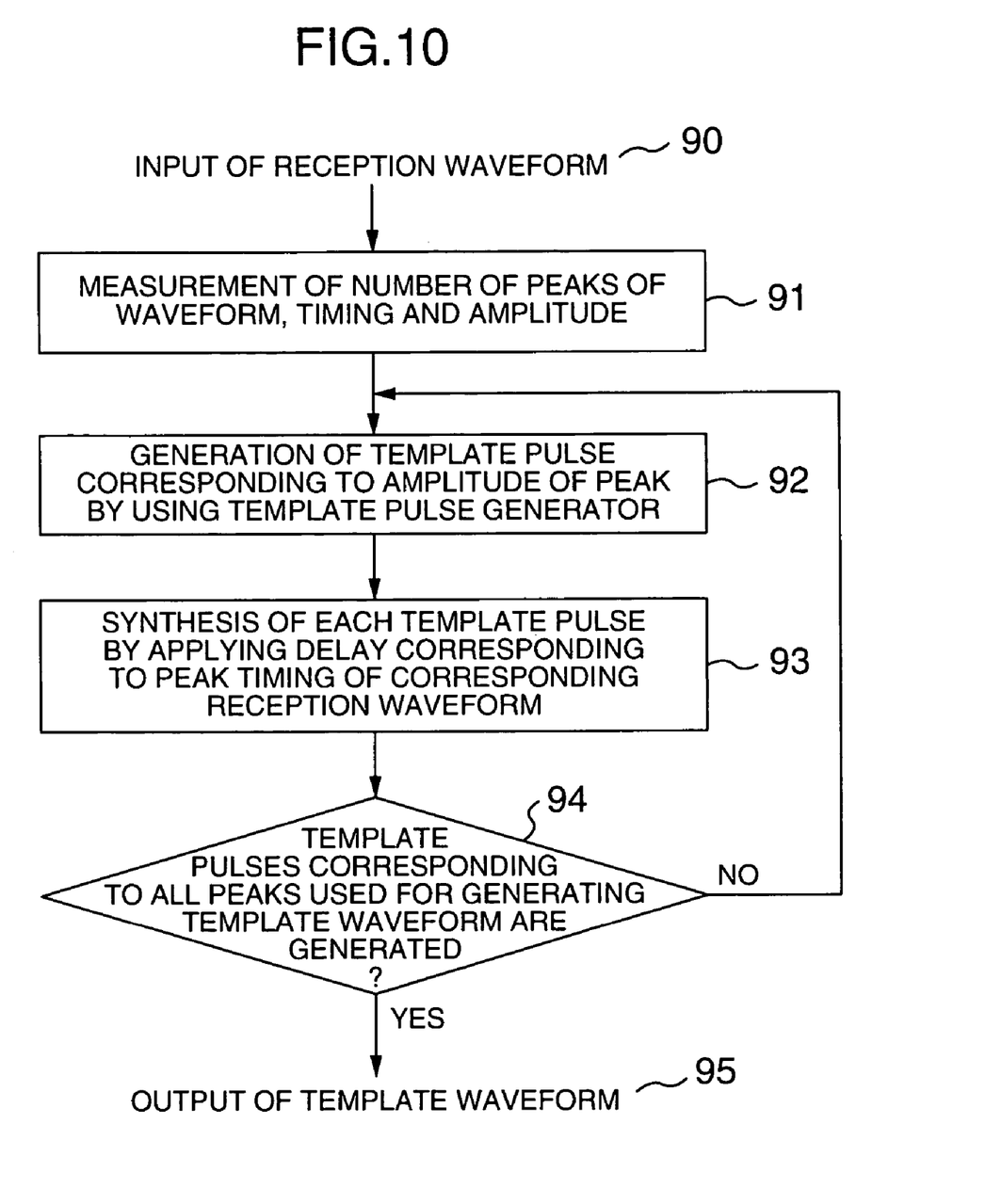
FIG. 10 shows an example of a flowchart of the reception timing measurement method.

FIG. 10 shows an example of the procedure for generating the template waveform by the reception timing measurement method according to the invention. The receiver segments by one pulse content the reception waveform of the propagation path condition judgment portion of the packet header portion and inputs it to the peak measurement portion (90). The peak measurement portion measures the number of amplitude peaks contained in the input waveform and the timing, and the magnitude of the amplitudes (91). Next, the peak measurement portion generates the template pulses corresponding to the respective amplitudes of the peaks so measured (92) and synthesizes them by applying the same delay time as the respective timing of the peaks. When the similar operation is made for all the peaks that the peak measurement portion decides to use for generating the template waveforms (94), the template waveform is generated (95). A judgment method as to whether or not the amplitude peaks inside the reception waveform are to be used for generating the template waveform includes a method that sets a threshold value using the maximum value of the waveform amplitude as the reference and uses the amplitude peaks for generating the template waveform when the peaks exceed the threshold value.

Next, a method that records a reception waveform and directly generates a template waveform from the reception waveform will be explained. This method will be hereinafter referred to as a "reception waveform synthesis method".

Figure 11:
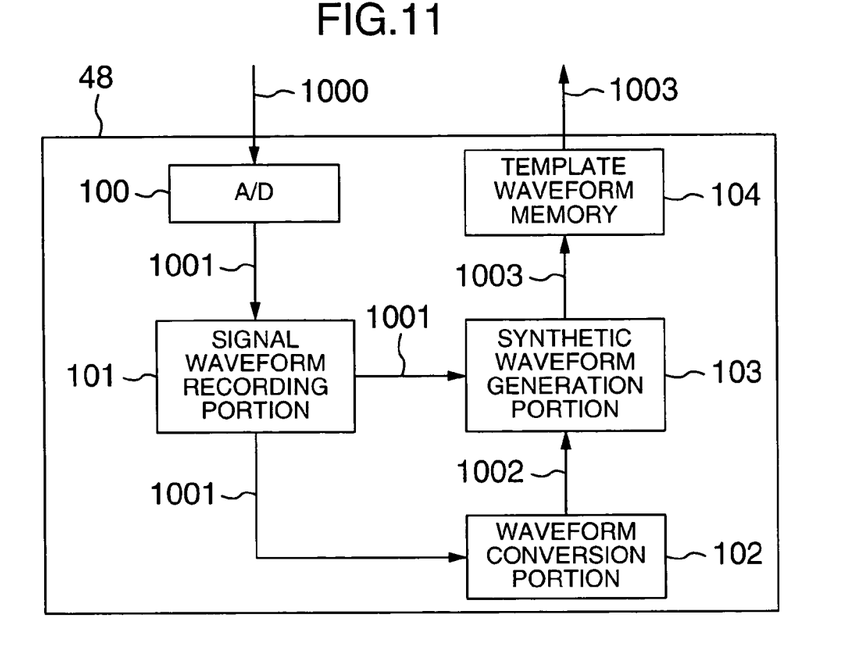
FIG. 11 shows an example of a template waveform generation portion of a reception waveform synthesis method.

FIG. 11 shows an example of a functional block diagram of a template waveform generation portion using the reception waveform synthesis method according to the invention. The template waveform generation portion includes an A/D converter (100) to which input pulses (1000) are inputted, a reception waveform recording portion (101) to which the A/D converted input pulses (1001) are inputted, a waveform conversion portion (102), a synthetic waveform generation portion (103) and a template waveform memory (104). The waveform conversion portion applies a time delay to the reception waveform and generates a waveform the phase of which is inverted, and outputs it as a waveform 1. The synthetic waveform generation portion synthesizes the inputted digital waveform data, generates a template waveform and output it as a template waveform 1003. The template waveform memory stores the waveform so synthesized.

Figure 12:
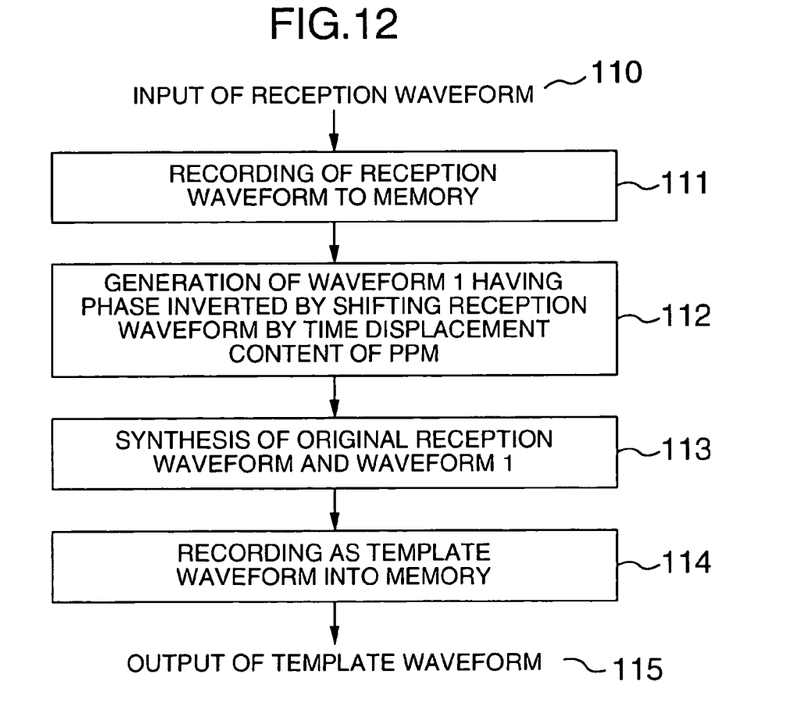
FIG. 12 shows an example of a flowchart of the reception waveform synthesis method.

FIG. 12 shows an example of the generation procedure of the template waveform by the reception waveform synthesis method according to the invention. The receiver segments by one pulse content the reception waveform of the inputted reception wave 110 of the propagation path condition judgment portion of the packet header portion and records it in the reception waveform recording portion (111). The reception waveform recording portion sends this reception waveform to the waveform conversion portion. The waveform conversion portion allows the reception waveform to undergo deformation time-wise in accordance with a time change amount of PPM modulation. When the inputted waveform is the transmission of the data "0", for example, the reception waveform is delayed by the time change amount in PPM modulation to generate the waveform when the data "1" is transmitted. The phase of this waveform is further inverted to generate the waveform 1 (112). The synthetic waveform generation portion synthesizes the waveform 1 with the reception waveform of the reception waveform recording portion and generates the template waveform (113). The template waveform thus generated is recorded to the template waveform memory (114) and is then outputted (115).

Figure 13:
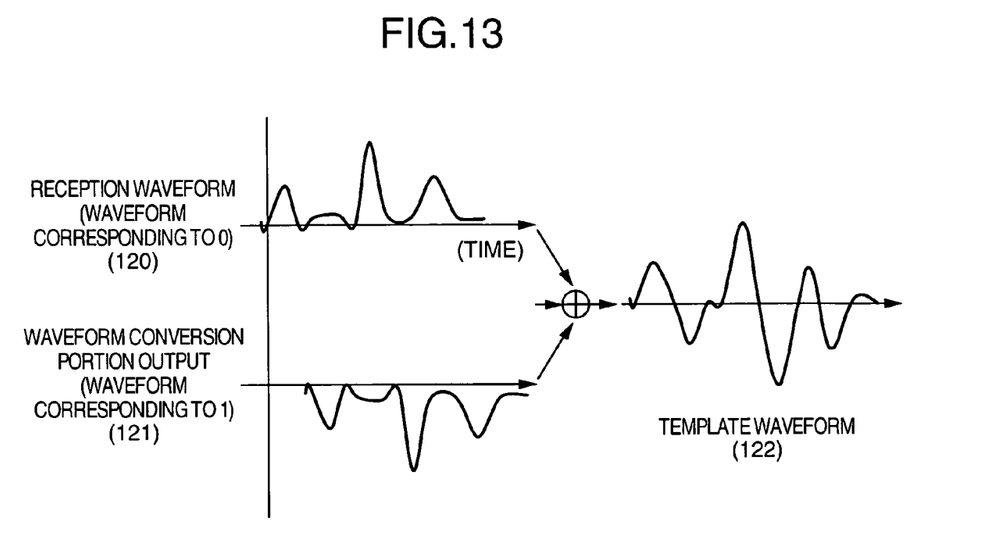
FIG. 13 shows an example of a template waveform by the reception waveform synthesis method.

FIG. 13 shows an example of the relation of the reception waveform (120), the output (121) of the waveform conversion portion and the template waveform (122).

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A radio signal receiver in a radio communication system for executing communication by transmitting and receiving pulse signals, comprising:
   a template generation portion for generating a template; and
   a correlation device for calculating correlation between the template generated and a signal received from a transmitter, wherein said template generation portion generates the template based on a reception waveform of a first signal as a known signal received from said transmitter, wherein said correlation device determines a correlation between a second signal received from said transmitter and the template and discriminates the second signal based on the correlation result, and wherein said template generation portion stores the reception waveform of the first signal as a first reference waveform, generates a second reference waveform by converting the first reference waveform and generates the template by synthesizing the first reference waveform and the second reference waveform.

2. A radio signal receiver as defined in claim 1, wherein said radio communication system discriminates whether the transmission signal is set to 0 or 1 from deviation of a transmission timing of a pulse signal from a reference time, and said template generation portion generates the template by synthesizing the first reference waveform and the second reference waveform obtained by inverting a sign of the first reference waveform and delaying the first reference waveform by a time corresponding to deviation of the transmission timing.

3. A radio signal receiver as defined in claim 1, wherein communication with said transmitter is made through a packet, the first signal is contained in a header portion of said packet and the second signal is contained in an information portion of said packet.

4. A radio communication system for performing communication by transmitting and receiving pulse signals, including a transmitter and a receiver, wherein said transmitter transmits a second signal after transmission of a predetermined first signal used for judging a propagation path condition between said transmitter and said receiver, wherein said receiver includes a template generation portion for generating a template, and a correlation device for calculating correlation between the template generated and the second signal received after the first signal, and performing detection, wherein said template generation portion acquires a reception waveform of the first signal and stores the reception waveform acquired as a first reference waveform, generates a second reference waveform by converting the first reference waveform, and generates the template by synthesizing said first reference waveform and said second reference waveform.

5. A radio communication system as defined in claim 4, wherein the first signal and the second signal are transmitted during one communication session.

6. A radio communication system as defined in claim 4, wherein said radio communication system discriminates whether the transmission signal is set to 0 or 1 from deviation of a transmission timing of a pulse signal from a reference time, and said template generation portion generates the template by synthesizing the first reference waveform and the second reference waveform obtained by inverting a sign of the first reference waveform and delaying the first reference waveform by a time corresponding to deviation of the transmission timing.

7. A signal receiving method in a radio signal communication system for performing communication by transmitting and receiving pulse signals, comprising the steps of:

receiving a first signal;

judging a propagation path condition between a transmitter and a receiver by use of the first signal;

generating a template used for correlation calculation with a reception signal in accordance with the propagation path condition judged; and performing the correlation calculation between the template and the second signal, wherein said step of generating the template includes a step of storing the reception waveform of the first signal as a first reference waveform, a step of generating a second reference waveform by changing the first reference waveform, and a step of synthesizing said first reference waveform and said second reference waveform.

8. A signal receiving method as defined in claim 7, wherein said radio communication system discriminates whether the transmission signal is set to 0 or 1 from deviation of a transmission timing of a pulse signal from a reference time, and wherein said step of generating the second reference waveform includes a step of inverting a signal of the first reference waveform and deviating its position on a time axis corresponding to deviation of the transmission timing.

9. A signal receiving method as defined in claim 7, wherein the first signal and the second signal are contained in the same packet.

* * * * *